US 6,612,963 B2

(12) United States Patent
Minowa et al.

(10) Patent No.: US 6,612,963 B2
(45) Date of Patent: Sep. 2, 2003

(54) POWER TRANSMISSION SYSTEM OF AN AUTOMOBILE

(75) Inventors: Toshimichi Minowa, Mito (JP); Hiroshi Sakamoto, Hitachi (JP); Mitsuo Kayano, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/339,595

(22) Filed: Jan. 10, 2003

(65) Prior Publication Data

US 2003/0104902 A1 Jun. 5, 2003

Related U.S. Application Data

(63) Continuation of application No. 10/102,973, filed on Mar. 22, 2002, now Pat. No. 6,523,436, which is a continuation of application No. 09/543,783, filed on Apr. 6, 2000, now abandoned.

(30) Foreign Application Priority Data

Jun. 4, 1999 (JP) .............................................. 11-99087

(51) Int. Cl.$^7$ ............................. B60K 41/02; B60K 1/00
(52) U.S. Cl. ........................................ 477/5; 180/65.3
(58) Field of Search ..................... 180/65.2, 65.3, 180/65.4; 477/3, 5; 475/5

(56) References Cited

U.S. PATENT DOCUMENTS

| 2,019,424 A | * | 10/1935 | Low .......................... 475/5 X |
| 2,330,397 A | * | 9/1943 | Trofimov ........................ 475/5 |
| 2,790,337 A | * | 4/1957 | Zelewsky et al. ............. 477/5 X |
| 2,924,991 A | * | 2/1960 | Whiting ...................... 475/5 X |
| 3,204,485 A | * | 9/1965 | Cogswell .................. 74/665 B |
| 3,367,438 A |   | 2/1968 | Moore et al. |
| 3,478,851 A | * | 11/1969 | Smyth et al. ................ 477/5 X |
| 4,233,858 A | * | 11/1980 | Rowlett ....................... 477/3 X |
| 4,335,429 A | * | 6/1982 | Kawakatsu .................. 364/424 |
| 4,382,484 A |   | 5/1983 | Anderson et al. |
| 4,470,476 A |   | 9/1984 | Hunt |
| 4,577,738 A | * | 3/1986 | Yater .......................... 477/5 X |
| 4,588,040 A | * | 5/1986 | Albright, Jr. et al. .. 180/65.4 X |
| 5,513,719 A | * | 5/1996 | Moroto et al. ............. 180/65.4 |
| 6,009,371 A | * | 12/1999 | Kobayashi ................... 701/112 |
| 6,020,697 A | * | 2/2000 | Shimasaki et al. ...... 180/65.3 X |
| 6,048,289 A | * | 4/2000 | Hattori et al. .............. 477/5 X |
| 6,142,907 A | * | 11/2000 | Minowa et al. ................. 477/5 |
| 6,146,302 A | * | 11/2000 | Kashiwase .................... 475/5 |
| 6,159,127 A | * | 12/2000 | Loeffler et al. ................ 477/5 |
| 6,251,042 B1 | * | 6/2001 | Peterson et al. ............... 477/3 |

FOREIGN PATENT DOCUMENTS

| DE | 2805594 | 8/1979 |
| FR | 2689821 | 10/1993 |
| JP | 57080923 | 5/1982 |
| JP | 10-217779 | 8/1998 |
| JP | 2000-142134 | 5/2000 |

\* cited by examiner

Primary Examiner—Charles A Marmor
Assistant Examiner—Roger Pang
(74) Attorney, Agent, or Firm—Crowell & Moring LLP

(57) ABSTRACT

A generator use gear enable to rotate freely against an input shaft of a transmission mechanism for altering a rotation number of an engine and a clutch mechanisms in which the input shaft of the transmission mechanism and the generator use gear are rotated together with are provided between the engine and the transmission mechanism. Further, on an extension line of the input of the transmission mechanism and to a rear portion of the transmission mechanism, an electric motor is provided. Accordingly, a compact size power transmission system of an automobile can be attained.

4 Claims, 3 Drawing Sheets

POWER TRANSMISSION SYSTEM OF AN AUTOMOBILE

This application is a con't of Ser. No. 10/102,973 filed Mar. 22, 2002 U.S. Pat. No. 6,523,436, which is a con't of Ser. No. 09/543,783 abandoned filed Apr. 6, 2000.

BACKGROUND OF THE INVENTION

The present invention relates to a power train system structure of an automobile which comprises an engine, and electric power means (hereinafter, it is called as an electric motor which is mainly used as a drive use, it is called a generator which is mainly used as a generator for engine starting, and a motor generator which has same used frequency degree as a drive use and as a generation use), and in particular to a power transmission system in which a compact size of the power train system of an automobile can be attained.

As a prior art of a power train system power transmission system in which a compact size and a light weight structure power train system is devised, there is Japanese application patent laid-open publication Hei 10-217779. In this Japanese application patent laid-open publication Hei 10-217779, a hybrid one body power transmission system is stated, such a power transmission system comprises of one motor generator, a gear transmission mechanism, and a clutch mechanism.

In this power transmission system, the transmission mechanism having the motor generator and the clutch mechanism is formed as one body in a housing of the power transmission system, accordingly it is possible to obtain a compact size power transmission system.

According to this Japanese application patent laid-open publication Hei 10-217779, in the transmission mechanism having the one motor generator and the clutch mechanism, it is possible to obtained the compact size power transmission system.

Further, in a power transmission system in which a further fuel consumption reduction and a further power performance improvement can be realized and further an electric motor is necessary, it is difficult to carry out an arrangement of the above stated elements, as a result it can not avoid a formation of a large size power transmission system.

SUMMARY OF THE INVENTION

An object of the present invention is to provide a power transmission system in which a compact size power transmission system comprised of two electric power means (a generator and an electric motor) and a clutch mechanism can be attained.

From an aspect of an earth environment problem, an establishment of a hybrid automobile control system in which a wide reduction of a consumption of an automobile can be expected becomes important. In the above stated hybrid automobile control system, by an employment of an electric motor, it is possible to operate an engine at a high efficiency area, however since an electric power means such as a generator is mounted, there is a limitation for a compact size hybrid automobile control system.

To solve the above stated problems, according to a power transmission system of an automobile of the present invention, the power transmission system of the automobile comprises a generator use gear enable to rotate freely against an input shaft of a transmission mechanism and a clutch mechanism enable to rotate together with an input shaft of said transmission mechanism and a generator use gear, and said generator use gear and said clutch mechanism are provided between an engine and said transmission mechanism.

In concretely the present invention provide a following power transmission system of an automobile.

A power transmission system of an automobile having an engine, a generator driven by an output of said engine, a battery charged by a generation output of said generator, an electric motor driven by a discharge output of said battery, and a transmission mechanism provided at a rear portion of an output shaft of said engine and for at least altering a rotation number of said engine, the power transmission system characterized in that the power transmission system comprises further a generator use gear enable to rotate freely against an input shaft of said transmission mechanism and a clutch mechanism enable to rotate together with said input shaft of said transmission mechanism and said generator use gear, and said generator use gear and said clutch mechanism are provided between said engine and said transmission mechanism.

Preferably, an output of said generator is arranged substantially in parallel against an input shaft of said transmission mechanism.

Preferably, at a rear portion of said transmission mechanism on an input shaft extension line of said transmission mechanism said electric motor is provided and an output of said electric motor is transmitted to an output of said transmission mechanism.

Preferably, said generator is arranged in a housing of said transmission mechanism.

Preferably, a high speed gear train of said transmission mechanism is arranged at a side of said engine from a low speed gear train of said transmission mechanism.

To solve the above stated problems, according to a power transmission system of an automobile of the present invention, an electric motor is arranged substantially orthogonal to an input shaft of a transmission mechanism.

In concretely, in a power transmission system of an automobile having an engine, a generator driven by an output of said engine, a battery charged by a generation output of said generator, an electric motor driven by a discharge output of said battery, and a transmission mechanism provided at a rear portion of an output shaft of said engine and for at least altering a rotation number of said engine, the power transmission system characterized in that said electric motor is arranged substantially orthogonal to an input shaft of said transmission mechanism.

Preferably, an output shaft of said transmission mechanism is provided substantially in parallel to an input shaft of said transmission mechanism, and said input of said transmission mechanism and said output of said transmission mechanism are connected together with substantially by a gear pair with intersecting axes.

DESCRIPTION OF THE PREFERRED EMBODIMENTS OF THE PRESENT INVENTION

Figure 1:
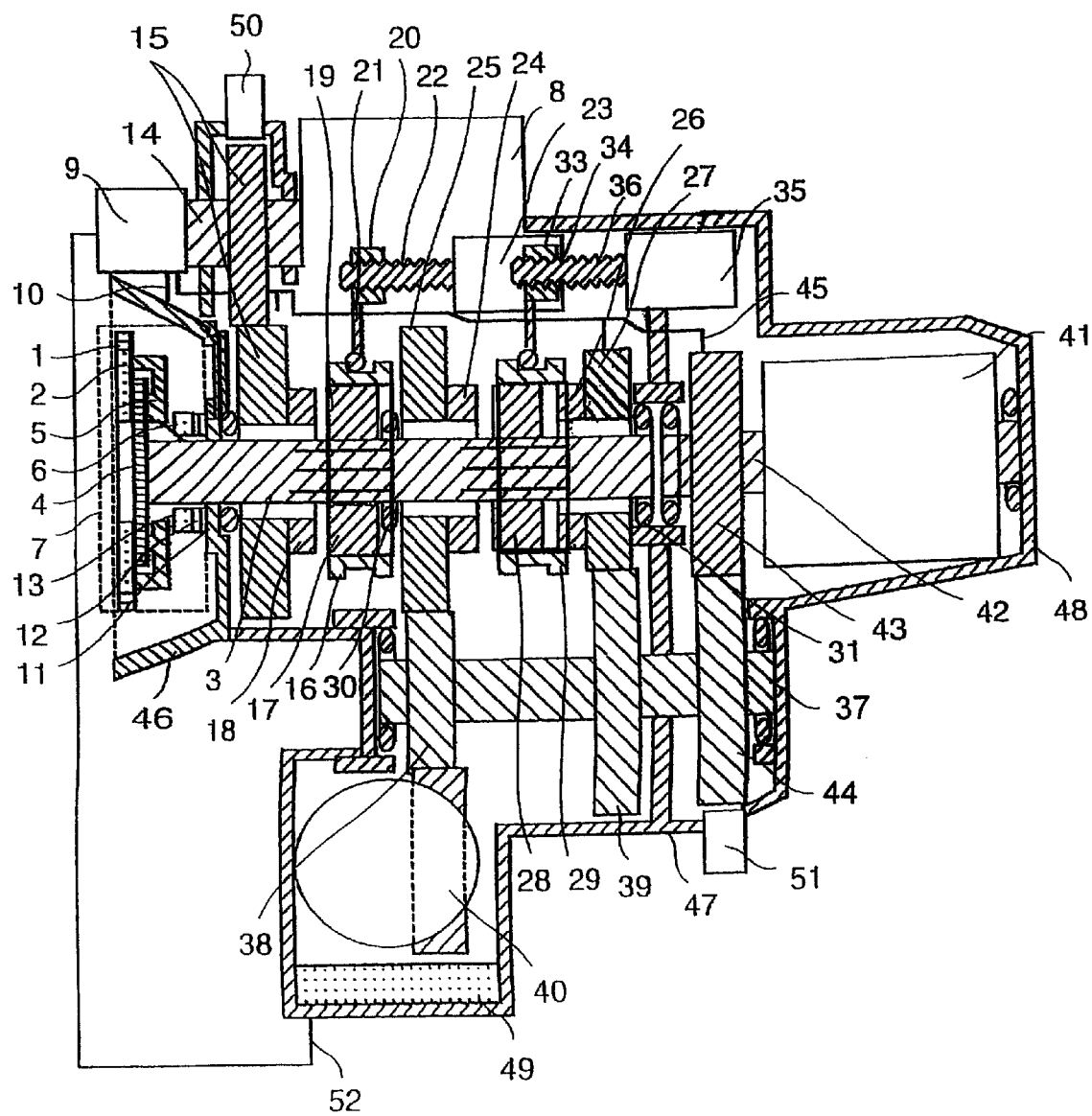
FIG. 1 is a construction view of a FF hybrid automobile use power transmission system of one embodiment according to the present invention.

Herein-after, a power transmission system of an automobile of one embodiment according to the present invention will be explained in detail referring to the drawings.

FIG. 1 is a construction view of a FF (a front engine, a front drive) hybrid automobile use power transmission system of one embodiment according to the present invention. As shown in FIG. 1, to a hybrid automobile use power transmission system, an engine starting clutch 7 is provided.

Such the engine starting clutch 7 comprises a connection part 1, a clutch plate supporting member 2 which is connected to the connection part 1 to a crank shaft (not shown in figure) of an engine, an output shaft 3 of a transmission means, a clutch plate 4 which is connected to the input shaft 3 of the transmission means, a clutch cover 5, and a plate spring member 6.

A release of the engine starting use clutch 7 is practiced according to an oil pressure which is generated by an oil pressure pump 9 which is driven using a generator 8. When the oil pressure does not catch properly, the engine starting use clutch 7 is fastened by a spring force of the clutch cover 5.

In an operation of the release of the engine starting use clutch 7, at first a generated oil pressure passes through an oil pressure pipe conduit 10 and is introduced into an oil pressure chamber 11. According to the above operation, a piston 12 is moved toward a left direction in FIG. 1 and a clutch releasing member 13 is pushed out and then the plate spring member 6 is operated.

The plate spring member 6 operates to open the clutch cover 5 and a push-out force of the clutch plate 4 becomes small and then the release of the engine starting use clutch 7 can be carried out. Herein, as the drive of the engine starting use clutch 7 the oil pressure is employed however it can apply an electric actuator such as a motor.

The engine starting use clutch 7 can realize a smooth torque characteristic during the engine starting and also can apply to ensure a starting performance according to the engine when an electric system gets out of order (for example, a motor trouble).

Further, as another object in the engine starting use clutch 7, the engine starting use clutch 7 is made as a semi-clutch condition and then the torque of the engine is transmitted, accordingly a power performance according to the engine during the starting increase, an output of the electric motor is made small and a compact size and a light weight structure electric motor can be realized.

A generator 8 is arranged in a transmission mechanism housing and as a construction the generator 8 is connected to the transmission mechanism input shaft 3 through a generator gear pair 15, a generator sleeve 16, a generator hub 17, and a gearing gear 18.

In an inner side of the generator hub 17, a groove (not shown in figure) is provided, such the groove is meshed with plural grooves 19 of the transmission mechanism input shaft 3. The generator 17 can move to an axial direction of the transmission mechanism input shaft 3. However, a move to a rotation direction of the transmission mechanism input shaft 3 is limited. Herein, when the generator sleeve 16 is meshed with both of the generator hub 17 and the gearing gear 18, a torque transmission between the generator 8 and the transmission mechanism input shaft 3 can be carried out.

When the generator sleeve 16 is meshed with only the generator hub 17, the torque transmission between the generator 8 and the transmission mechanism input shaft 3 can not be carried out. To carry out the move of the generator sleeve 16, a linear actuator is applied, such a linear actuator comprises a lever 21 to which a nut 20 is provided and a bolt which rotates according to a motor 23.

The above linear actuator does not move because the bolt 22 is meshed with a screw portion of the nut 20 against an anti-force from the generator sleeve 16. As a result, an energy (an electric power consumption amount) during a fixing of the above generator sleeve 16 becomes unnecessary. Accordingly, a fuel consumption reduction of the automobile can be improved.

As stated in above, an output shaft 14 of the generator 8 and the transmission mechanism-input shaft 3 are arranged substantially in parallel, the power transmission from the generator 8 to the engine can be practiced. In this case, an shaft length between from the engine and generator gear pair 15 becomes short, a shaft vibration during the drive of the generator 8 can be restrained.

Further, since an installation space for the generator 8 can be formed to coincide with a starter installation portion of the conventional transmission apparatus (an electric motor is not provided in a transmission means), the installation of the generator 8 can be realized without a wide remodeling of the power transmission system, accordingly a compact size power transmission system of the automobile can be improved.

Next, the transmission mechanism will be explained. The transmission mechanism according to the present invention comprises a high speed use engine side gear 25 having a gearing gear 24, a low speed use engine side gear 27 having a gearing gear 26, and a hub 28 and a sleeve 29 which comprise a mesh-type clutch and connect directly the high speed use engine side gear 25, the low speed use engine side gear 27 and the transmission mechanism input shaft 3.

The stoppers 30 and 31 are provided to not move. the high speed use engine side gear 25 and the low speed use engine side gear 27 toward the transmission mechanism input shaft 3.

In an inner side of the hub 28, a groove (not shown in figure) is provided, such the groove is meshed with plural grooves 19 of the transmission mechanism input shaft 3. This hub 28 can move to the axial direction of the transmission mechanism input shaft 3. However, a move to a rotation direction of the transmission mechanism input shaft 3 is limited. Accordingly, a torque which is outputted from the engine is transmitted to the hub 28 and the sleeve 29.

To transmit the torque from the engine to the high speed use engine side gear 25 and to the low speed use engine side gear 27, it is necessary to move the sleeve 29 to the axial direction of the transmission mechanism input shaft 3 and to connect directly the gearing gear 24 or 26 and the hub 28.

To the gearing gear 24 or 26 and the hub 28, a same groove is provided and at an inner side of the sleeve 29 another groove (not shown in figure) is provided, and this another groove is meshed with the hub 28. To move the sleeve 29, a linear actuator is applied, such a linear actuator comprises a lever 34 to which a nut 33 is provided and a bolt 36 which rotates according to a motor 35.

The drive of the linear actuator is similar to that of the above stated linear actuator and an explanation thereof will be omitted.

Next, high speed use engine side gear 25 is meshed with a high speed use output shaft gear 38 which is connected directly to the transmission mechanism output shaft 37. The low speed use engine side gear 27 is meshed with a low speed use output shaft gear 39 which is connected directly to the transmission mechanism output shaft 37. Further, the high speed use output gear 38 is meshed with a differential gear 40 and then the torque which is outputted from the power transmission system is transmitted to the tires of the automobile.

Herein, the reason why the high speed use engine side gear 25 is arranged to the engine side from the low speed use engine side gear 27 will be explained. In a case where the automobile runs according to the high speed use engine side gear 25, since an engine rotation number is low, a torque fluctuation between the engine cylinders is transmitted to the transmission mechanism input shaft 3 and then a twist vibration in the transmission mechanism input shaft 3 generates.

Accordingly, to restrain the above twist vibration, when the torque is transmitted to the transmission mechanism output shaft, it is profitable to have a shorter length of the transmission mechanism input shaft 3 from the engine to the torque transmission gear.

Next, an arrangement of the electric motor 41 will be explained. The electric motor 41 is arranged at an extension line of the transmission mechanism input shaft and at a rear portion of the transmission mechanism. An electric motor gear 43 is meshed with an electric motor output shaft gear 44 which is provided to the transmission mechanism output shaft 37.

A reason why the electric motor 41 is arranged at the extension line of the transmission mechanism input shaft 3 is that it can be utilized validly the space of the conventional manual transmission means. In other words, when using the power transmission system according to the present invention the power transmission similar to that of the conventional vehicle is intended to realize, it is possible to perform a torque assistance between the electric motor 41 and the generator 8, a transmission mechanism section can be formed fully with two gear train degree.

As a result, since the gear train from three gear train to five gear train can be deleted, at an empty space the electric motor 41 can be arranged.

Next, a lubricating manner of the above stated gear will be explained. In the oil pressure pump 9, a low pressure oil for a lubricating use is generated. This low pressure oil passes through a lubricating use pipe 45 and is led to an upper side of each of the gear trains and accompanying with a rotation of the gear this low pressure oil is supplied to a lower side gear successively.

Further, the oil which is used for the lubrication is collected in an oil pan 49 and the collected oil is sucked by the oil pressure pump 9 through a filter means (not shown in figure) and an oil introducing conduit 52a.

A case of the power transmission system comprises separately a front case 46, a middle case, and a rear case 48 and they are fixed using screw means (not shown in figure). The above stated generator 8, the gear trains, and the electric motor 41 etc. are assembled from a condition where the above stated cases have been decomposed.

Further, between the rotary body such as the gear trains etc. and the case, between the gear trains, ball bearing means (similar to the stopper 30) are provided and then the fuel consumption aggravation according to an increase by the friction loss can be restrained.

Further, in the middle case 47, a generator use rotation sensor 50 for detecting an output shaft rotation number of the generator 8 and an electric motor use rotation sensor 51 for detecting an output shaft rotation number of the electric motor 41 are provided.

Since the electric motor use rotation sensor 51 detects pulses of the electric motor use output shaft gear 44, using the electric motor use rotation sensor 51 to request the output shaft rotation number of the electric motor, it is necessary to convert using a gear ratio with the electric motor gear 43. Further, the electric motor use rotation sensor 51 can apply to the vehicle speed.

Figure 2:
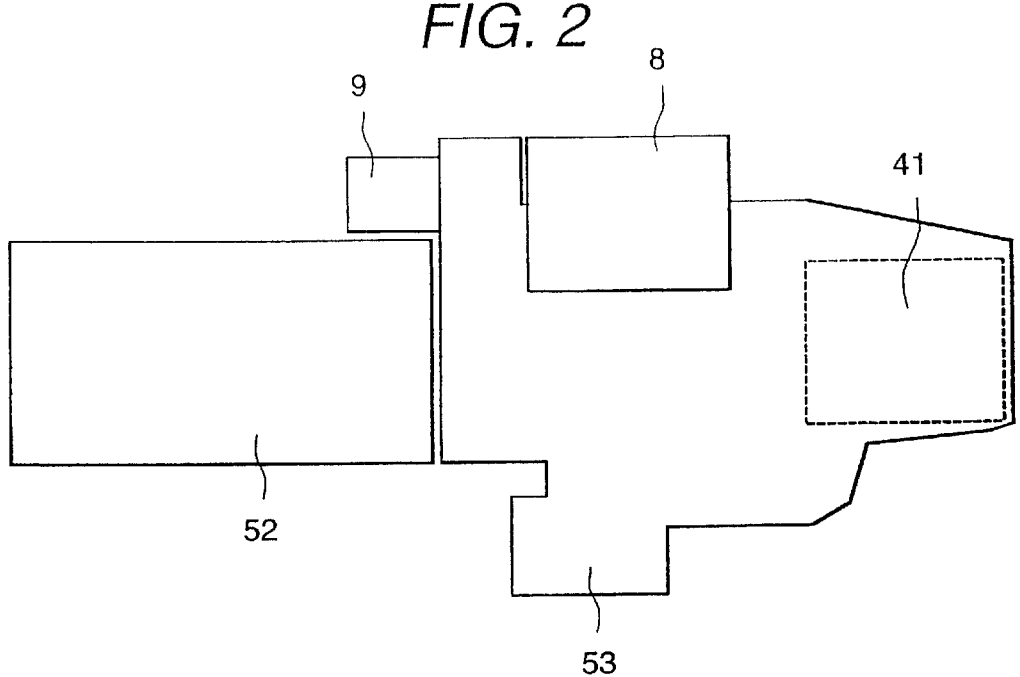
FIG. 2 is an appearance view of a power train including the power transmission system shown in FIG. 1.

FIG. 2 shows an appearance view of a power train including the power transmission system shown in FIG. 1. To the engine 52 the power transmission system 53 is provided. An upper side of this power transmission system 53 the generator 8 is installed and according to the generator 8 the oil pressure pump 9 is driven.

Further, in an interior portion rear portion of the power transmission system 53 the electric motor 41 is provided. Accordingly, with the above stated construction, a hybrid automobile use power transmission system similar to the conventional manual transmission apparatus can be realized.

Figure 3:
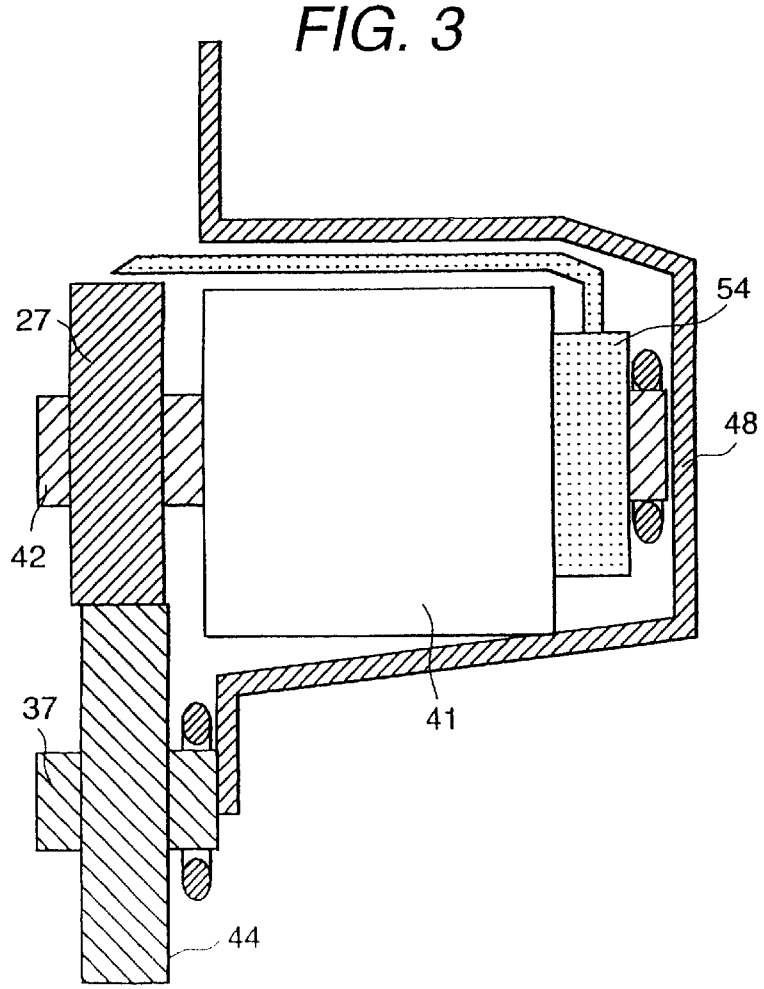
FIG. 3 is a construction view in which an oil pressure pump is driven by an electric motor.

FIG. 3 is a construction view in which the oil pressure pump is driven by the electric motor. To an output shaft 42 of the electric motor 41 an oil pressure pump 54 is provided. In the power transmission system according to the present invention, during the vehicle running, the output shaft 42 of the electric motor 41 rotates necessarily.

During a coasting running such as a descending road (a down slope road) without the supply of the electric power to the electric motor 41, since it is possible to drive the oil pressure pump 54, it is possible to perform the oil pressure generation in which the reduction energy of the vehicle is utilized. Accordingly, since it is unnecessary to produce the oil pressure generating energy, therefore the fuel consumption reduction of the automobile can be attained.

Figure 4:
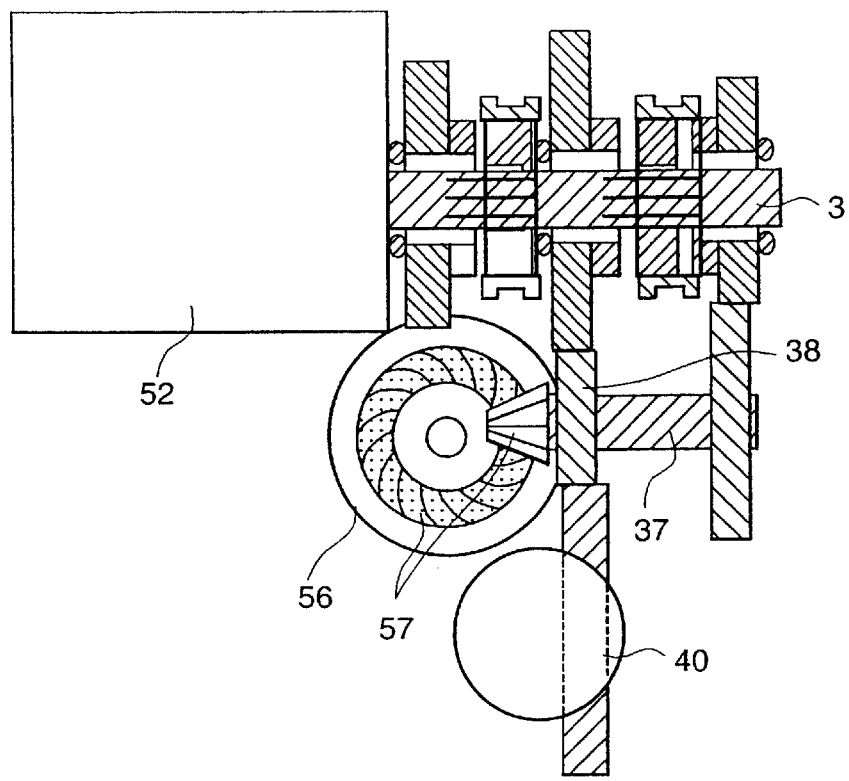
FIG. 4 is a construction view of a hybrid automobile use power transmission system of another embodiment according to the present invention.

FIG. 4 is a construction view showing a hybrid automobile use power transmission system of another embodiment according to the present invention. As shown in FIG. 4, in this power transmission system, since there is no space at the rear portion of the transmission mechanism input shaft 3 which is connected directly to a crank shaft (not shown in figure) of the engine 52 and it is impossible to arrange the electric motor.

In the above stated power transmission system, from an aspect of the space it is the optimum in which at a lower portion of the transmission mechanism input shaft 3 an electric motor 56 is provided and according a compact size power transmission system can be attained. In this case, to the transmission mechanism output shaft 37 and an output shaft of the electric motor 56 a gear pair with intersecting axes 57 is provided and at a position where the transmission mechanism input shaft 3 and the transmission mechanism output shaft 37 are orthogonal the electric motor 56 is arranged.

Accordingly, an output of the electric motor 56 is transmitted as a torque to the differential gear 40 through the gear pair with intersecting axes 57 and the high speed use output shaft gear 38.

Figure 5:
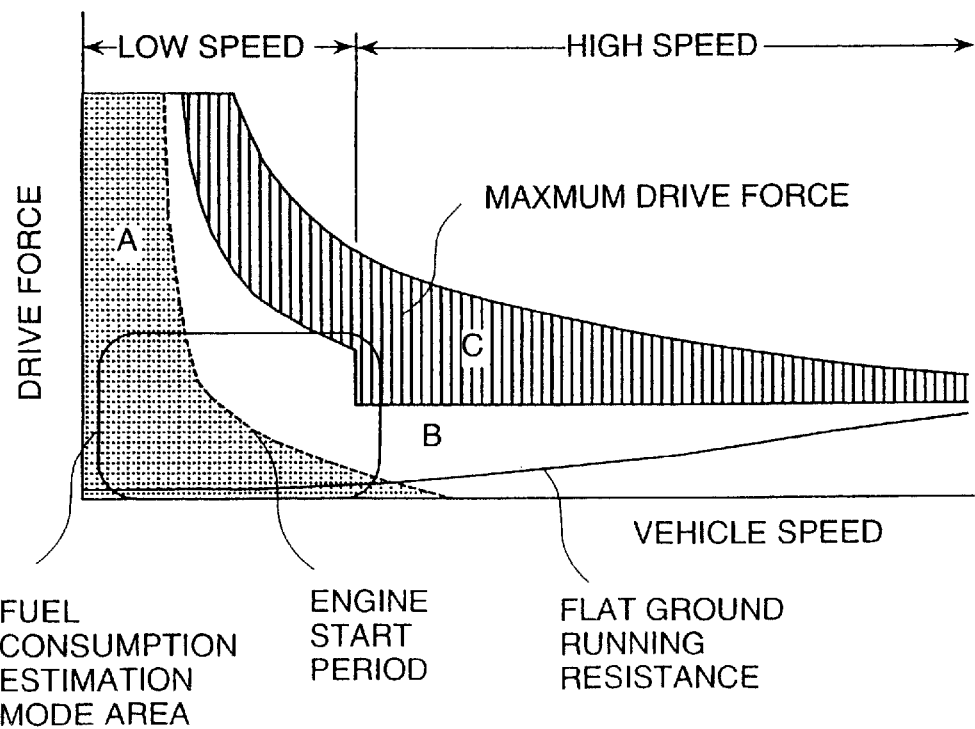
FIG. 5 is a power performance graph according to the present invention.

FIG. 5 is a power performance graph according to the present invention. In the power train according to the present invention, in an area A the it is the running in which the electric motor and the generator are combined or only using the electric motor, and in an area B it is the running in which to a drive force of the area A the engine output is added. In an area C, it shows a drive force in which to the drive forces of the area A and the area B the electric motor output is added.

The maximum drive force is one to which all of the above stated drive forces of the three areas A, B, C are added. Herein, a portion enclosed with a real line is an area which is used according to a fuel consumption estimation operation mode (for example, 10–15 modes). In this area to attain the fuel consumption reduction, it is necessary to select a better efficiency according to the drive by the electric motor and according to the drive by the engine.

A hybrid automobile using the power transmission system according to the present invention, a drive force distribution shown in FIG. 5 is optimum. Namely, in an operation area where the engine rotation number is low (less than 1400 rpm) and the engine torque is small (less than a half of the maximum torque), the fuel consumption of the automobile can be reduced according to the running using the electric motor and an operation area except for above the fuel consumption can be reduced according to the running using the engine.

Further, the gear ratio between the above stated high speed use gear train and the above stated low speed use gear train is set to change over at a vicinity of the engine rotation number of 1400 rpm. At the starting time of the engine, it is important that engine starting use clutch 7 is operated and the starting can be carried out smoothly.

When the engine starting clutch 7 is not provided, the rotation number of the transmission mechanism input shaft 3 and the rotation number of the transmission mechanism output shaft 37 are coincided and the sleeve 29 is moved and then the low speed use gear is fastened.

According to the present invention, since the power transmission system is constituted that in which the conventional manual transmission means is made as a base, the transmission use gear train can be deleted and to the deleted space the electric motor is provided and further in which to the conventional stator installation space the generator is arranged, the generator and the electric motor can be received in the conventional manual transmission means. Accordingly, a compact size power transmission system of a hybrid automobile can be attained.

What is claimed is:

1. A power transmission system of an automobile having an engine, a generator driven by an output of said engine for charging a battery, a battery-driven electric motor and a transmission mechanism provided at a rear portion of an output shaft of said engine and for at least changing a rotation speed of said engine, the power transmission system further comprising a generator use gear enable to rotate freely about an input shaft of said transmission mechanism and a clutch mechanism enable to rotate together with said input shaft of said transmission mechanism and said generator use gear, wherein said clutch mechanism is a clutch mechanism that in a predetermined low speed region combines said generator use gear and the input shaft of said transmission mechanism, and said clutch mechanism changes over a running condition according to a drive force by said electric motor or a running condition according to a drive force by said generator and said drive force by said electric motor, and said transmission mechanism has low speed use engine side gear trains and high speed use engine side gear trains, and said high speed use engine side gear trains are arranged at a side away from said engine and said low speed engine side gear trains.

2. A power transmission system of an automobile according to claim 1, wherein an output shaft of said generator is arranged substantially in parallel to said input shaft of said transmission mechanism.

3. A power transmission system of an automobile according to claim 1, wherein said electric motor is arranged substantially orthogonal to said input shaft of said transmission mechanism.

4. A power transmission system of an automobile according to claim 1, wherein an output shaft of said transmission mechanism is substantially in parallel to said input shaft of said transmission mechanism, and said input shaft of said transmission mechanism and said output shaft of said transmission mechanism are operatively connected by a gear pair with intersecting axes.

* * * * *